(12) United States Patent
Wolf et al.

(10) Patent No.: US 9,916,136 B2
(45) Date of Patent: *Mar. 13, 2018

(54) INTERFACE INFRASTRUCTURE FOR A CONTINUATION BASED RUNTIME

(71) Applicant: Microsoft Technology Licensing, LLC, Redmond, WA (US)

(72) Inventors: Kenneth D. Wolf, Seattle, WA (US); Edmund Samuel Victor Pinto, Duvall, WA (US); Robert Brian Schmidt, Woodinville, WA (US); Donald F. Box, Bellevue, WA (US); Geoffrey M. Kizer, Seattle, WA (US); Nathan C. Talbert, Seattle, WA (US); Kavita Kamani, Issaquah, WA (US); Alberto Arias Maestro, Seattle, WA (US); David Robert Cliffe, Bellevue, WA (US); Tirunelveli R. Vishwanath, Redmond, WA (US); HongMei Ge, Issaquah, WA (US); Stephen Jared Maine, Seattle, WA (US); Alexander Martin DeJarnatt, Charlottesville, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/167,623

(22) Filed: May 27, 2016

(65) Prior Publication Data

US 2016/0274869 A1 Sep. 22, 2016

Related U.S. Application Data

(63) Continuation of application No. 12/345,288, filed on Dec. 29, 2008, now Pat. No. 8,354,847.

(51) Int. Cl.
 *G06F 9/44* (2006.01)

(52) U.S. Cl.
 CPC ........... *G06F 8/30* (2013.01); *G06F 8/313* (2013.01)

(58) Field of Classification Search
 CPC ............ G06F 8/20; G06F 8/30; G06F 9/5038
 See application file for complete search history.

(56) References Cited

U.S. PATENT DOCUMENTS 5,490,097 A  2/1996 Swenson et al.
5,748,962 A  5/1998 Brechtel et al.
(Continued)

FOREIGN PATENT DOCUMENTS

GB  2396928 A  7/2004
JP  2003331095 A  11/2003
(Continued)

OTHER PUBLICATIONS

"Action Workflow Enterprise Series 3.0 Process Builder User's Guide", in Action Technologies Inc., 1996, 290 Pages.
(Continued)

*Primary Examiner* — Duy Khuong Nguyen
(74) *Attorney, Agent, or Firm* — Workman Nydegger (57) ABSTRACT

Interfaces for a continuation-based runtime. Some embodiments described herein are directed to a framework using continuation based runtime interface that pertain to an infrastructure for enabling the creation of a wide variety of continuation-based programs that perform a wide-array of tasks. The infrastructure provides a foundation for building continuation-based, declarative applications of various scale and complexity.

4 Claims, 2 Drawing Sheets

(56) References Cited

U.S. PATENT DOCUMENTS

| | | | |
|---|---|---|---|
| 5,918,226 A | 6/1999 | Tarumi et al. |
| 5,960,404 A | 9/1999 | Chaar et al. |
| 5,999,910 A | 12/1999 | Rosenfeld et al. |
| 5,999,911 A | 12/1999 | Berg et al. |
| 6,041,306 A | 3/2000 | Du et al. |
| 6,047,260 A | 4/2000 | Levinson |
| 6,065,009 A | 5/2000 | Leymann et al. |
| 6,108,711 A | 8/2000 | Beck et al. |
| 6,115,640 A | 9/2000 | Tarumi |
| 6,134,559 A | 10/2000 | Brumme et al. |
| 6,151,583 A | 11/2000 | Ohmura et al. |
| 6,253,369 B1 | 6/2001 | Cloud et al. |
| 6,272,672 B1 | 8/2001 | Conway |
| 6,282,531 B1 | 8/2001 | Haughton et al. |
| 6,308,224 B1 | 10/2001 | Leymann et al. |
| 6,339,838 B1 | 1/2002 | Weinman, Jr. |
| 6,397,191 B1 | 5/2002 | Notani et al. |
| 6,434,568 B1 | 8/2002 | Bowman-Amuah |
| 6,442,528 B1 | 8/2002 | Notani et al. |
| 6,473,794 B1 | 10/2002 | Guheen et al. |
| 6,499,023 B1 | 12/2002 | Dong et al. |
| 6,539,396 B1 | 3/2003 | Bowman-Amuah |
| 6,578,006 B1 | 6/2003 | Saito et al. |
| 6,675,133 B2 | 1/2004 | Knowles et al. |
| 6,678,696 B1* | 1/2004 | Helland .................. G06Q 10/02 |
| 6,697,784 B2 | 2/2004 | Bacon et al. |
| 6,769,113 B1 | 7/2004 | Bloom et al. |
| 6,772,216 B1 | 8/2004 | Ankireddipally et al. |
| 6,772,407 B1 | 8/2004 | Leymann et al. |
| 6,801,227 B2 | 10/2004 | Bocionek et al. |
| 6,820,118 B1 | 11/2004 | Leymann et al. |
| 6,826,579 B1 | 11/2004 | Leymann et al. |
| 6,839,062 B2 | 1/2005 | Aronson et al. |
| 6,847,974 B2 | 1/2005 | Wachtel |
| 6,854,016 B1 | 2/2005 | Kraenzel et al. |
| 6,877,153 B2 | 4/2005 | Konnersman |
| 6,941,514 B2 | 9/2005 | Bradford |
| 6,968,503 B1 | 11/2005 | Chang et al. |
| 6,983,421 B1 | 1/2006 | Lahti et al. |
| 7,069,536 B2 | 6/2006 | Yaung |
| 7,120,800 B2 | 10/2006 | Ginter et al. |
| 7,240,070 B1 | 7/2007 | Man Cheng et al. |
| 7,370,335 B1 | 5/2008 | White et al. |
| 7,464,366 B2 | 12/2008 | Shukla et al. |
| 7,698,383 B2 | 4/2010 | Goring et al. |
| 7,827,127 B2 | 11/2010 | Wolf et al. |
| 7,881,233 B2 | 2/2011 | Bieselin |
| 8,862,507 B2 | 10/2014 | Sandhu et al. |
| 2002/0016810 A1 | 2/2002 | Watanabe |
| 2002/0030703 A1 | 3/2002 | Robertson et al. |
| 2002/0032775 A1 | 3/2002 | Venkataramaiah et al. |
| 2002/0038450 A1 | 3/2002 | Kloppmann et al. |
| 2002/0065701 A1 | 5/2002 | Kim et al. |
| 2002/0147611 A1 | 10/2002 | Greene et al. |
| 2002/0161615 A1 | 10/2002 | Yui et al. |
| 2002/0184401 A1* | 12/2002 | Kadel, Jr. ............. G06F 9/4443 719/310 |
| 2002/0188597 A1 | 12/2002 | Kern et al. |
| 2003/0004770 A1 | 1/2003 | Miller et al. |
| 2003/0004771 A1 | 1/2003 | Yaung |
| 2003/0018627 A1 | 1/2003 | Turner et al. |
| 2003/0023622 A1 | 1/2003 | Obermeyer et al. |
| 2003/0033191 A1 | 2/2003 | Davies et al. |
| 2003/0055668 A1 | 3/2003 | Saran et al. |
| 2003/0078975 A1 | 4/2003 | Ouchi |
| 2003/0090514 A1 | 5/2003 | Cole et al. |
| 2003/0105654 A1 | 6/2003 | MacLeod et al. |
| 2003/0135384 A1 | 7/2003 | Nguyen |
| 2003/0181991 A1 | 9/2003 | Chau et al. |
| 2003/0217053 A1 | 11/2003 | Bachman et al. |
| 2003/0233374 A1 | 12/2003 | Spinola et al. |
| 2004/0015841 A1 | 1/2004 | Lepejian et al. |
| 2004/0046789 A1* | 3/2004 | Inanoria .................. G06F 8/38 715/748 |
| 2004/0068728 A1 | 4/2004 | Blevins |
| 2004/0078105 A1 | 4/2004 | Moon et al. |
| 2004/0103014 A1 | 5/2004 | Teegan et al. |
| 2004/0111430 A1 | 6/2004 | Hertling et al. |
| 2004/0117795 A1 | 6/2004 | Wang et al. |
| 2004/0122853 A1 | 6/2004 | Moore |
| 2004/0138939 A1 | 7/2004 | Theiler |
| 2004/0162741 A1 | 8/2004 | Flaxer et al. |
| 2004/0199614 A1 | 10/2004 | Shenfield et al. |
| 2004/0201604 A1 | 10/2004 | Kraenzel et al. |
| 2004/0268338 A1 | 12/2004 | Gurpinar et al. |
| 2005/0005259 A1 | 1/2005 | Avery et al. |
| 2005/0015711 A1 | 1/2005 | Yamamoto et al. |
| 2005/0044173 A1 | 2/2005 | Olander et al. |
| 2005/0066287 A1 | 3/2005 | Tattrie et al. |
| 2005/0096959 A1 | 5/2005 | Kumar et al. |
| 2005/0149908 A1 | 7/2005 | Klianev |
| 2005/0203757 A1 | 9/2005 | Lei et al. |
| 2005/0234902 A1 | 10/2005 | Meredith et al. |
| 2006/0069605 A1* | 3/2006 | Hatoun .................. G06Q 10/06 705/7.15 |
| 2006/0195347 A1 | 8/2006 | Bultmeyer et al. |
| 2006/0229924 A1 | 10/2006 | Aron et al. |
| 2006/0235964 A1 | 10/2006 | Childress et al. |
| 2006/0294048 A1 | 12/2006 | Shukla et al. |
| 2007/0156485 A1 | 7/2007 | Sanabria et al. |
| 2007/0156486 A1 | 7/2007 | Sanabria et al. |
| 2007/0156487 A1 | 7/2007 | Sanabria |
| 2007/0156888 A1 | 7/2007 | Hilerio et al. |
| 2007/0233969 A1* | 10/2007 | Shukla .................. G06F 9/4881 711/150 |
| 2007/0234129 A1 | 10/2007 | Shukla et al. |
| 2007/0239498 A1 | 10/2007 | Shukla et al. |
| 2007/0239499 A1 | 10/2007 | Shukla et al. |
| 2007/0239505 A1 | 10/2007 | Shukla et al. |
| 2007/0245300 A1 | 10/2007 | Chan et al. |
| 2008/0040417 A1 | 2/2008 | Juncker |
| 2008/0114628 A1 | 5/2008 | Johnson et al. |
| 2008/0126161 A1* | 5/2008 | Willis .................... G06Q 10/06 719/320 |
| 2008/0127156 A1 | 5/2008 | Buza et al. |
| 2008/0162565 A1* | 7/2008 | Waguet .................. G06F 9/542 |
| 2008/0167925 A1 | 7/2008 | Mehta et al. |
| 2008/0243524 A1 | 10/2008 | Agrawal et al. |
| 2009/0222827 A1* | 9/2009 | Pinto .................... G06F 9/4428 718/102 |
| 2010/0036859 A1 | 2/2010 | Pinto et al. |
| 2010/0070422 A1 | 3/2010 | Kikuchi et al. |
| 2010/0169862 A1 | 7/2010 | Wolf |
| 2010/0306778 A1 | 12/2010 | Wolf et al. |
| 2010/0324948 A1 | 12/2010 | Kumar et al. |
| 2013/0125136 A1 | 5/2013 | Kalra et al. |
| 2015/0206079 A1 | 7/2015 | Sanabria et al. |

FOREIGN PATENT DOCUMENTS

| | | |
|---|---|---|
| JP | 2005506618 | 3/2005 |
| KR | 20010063810 A | 7/2001 |
| WO | 0221314 A2 | 3/2002 |
| WO | 2004055633 A2 | 7/2004 |
| WO | 2004059938 A2 | 7/2004 |
| WO | 2004077262 A2 | 9/2004 |
| WO | 2005063253 A1 | 7/2005 |

OTHER PUBLICATIONS

"Analytic Calculation Engine Metadata Classes", Retrieved from <<http://docs.oracle.com/cd/E13292_01/pt849pbr0/eng/psbooks/tpcr/htm/tpcr04.htm>>, Mar. 2007, 70 Pages.

"Making a J2EE Application a Transparent Service, Scott Dietzen, CTO of BEA, Told its Entire Web Service, BEA WebLogic Server 6.1 & WebLogic Integration", In Computopia, vol. 36, No. 420, Sep. 1, 2001, 9 Pages.

"New Age of Application Servers, 21st Century for 'Software Industry' Wherein EJB Components Are Commonly Used", In Computopia, vol. 35, No. 410, Nov. 1, 2000, 5 Pages.

"Openwings Data Services Specification Beta Ver 0.81", In General Dynamics Decision Systems, Inc., May 16, 2002, 57 Pages.

(56) References Cited

OTHER PUBLICATIONS

"Oracle Workflow", In Oracle Developer's Guide, Sep. 2003, 621 Pages.
"SAP EDI Work Flow Set up Part Three", Retrieved from <<https://web.archive.org/web/20111117034021/http://www.abapprogramming.net/2009_03_01_archive.html>>, Retrieved Date: Oct. 28, 2011, 17 Pages.
"Softwaremaker- Windows Communication Foundation (WCF) aka Indigo", Retrieved from <<https://web.archive.org/web/20100618222302/http://www.softwaremaker.net/blog/CategoryView, category, Windows%2BCommunication%2BFoundation%2B(WCF)%2Baka%2BIndigo.aspx>>, Nov. 15, 2007, 22 Pages.
"Streamlined, Customized Workflow Demonstrates Power and Flexibility of Development Platform", Microsoft IT Showcase, Technical Case Study, Oct. 2007, 12 Pages.
"Team WARE: Team WARE Flow 2.0 Chosen as Product of Choice for Collaboration & D Ad-hoc Workflow Apps", In M2 Press Wire, ProQuest ID 25682717, Jan. 7, 1998, 2 Pages.
"Useful! Method for Using an Application Server, Higuchi Laboratory, 15th Installment", In Notes/Domino Magazine, vol. 5, No. 8, Aug. 1, 2000, 9 Pages.
"Window Workflow Foundation", Retrieved from <<http://msdn.microsoft.com/windowsvista/building/workflow/default.aspx, Retrieved Date: Nov. 16, 2005, 4 Pages.
"Final Office Action Issued in U.S. Appl. No. 11/321,490", dated May 22, 2009, 18 Pages.
"Final Office Action Issued in U.S. Appl. No. 11/321,490", dated Mar. 19, 2010, 19 Pages.
"Final Office Action Issued in U.S. Appl. No. 11/321,490", dated Mar. 1, 2013, 19 Pages.
"Non Final Office Action Issued in U.S. Appl. No. 11/321,490", dated Sep. 21, 2012, 19 Pages.
"Non Final Office Action Issued in U.S. Appl. No. 11/321,490", dated Nov. 29, 2013, 9 Pages.
"Non Final Office Action Issued in U.S. Appl. No. 11/321,490", dated Sep. 17, 2009, 18 Pages.
"Non Final Office Action Issued in U.S. Appl. No. 11/321,490", dated Sep. 22, 2008, 17 Pages.
"Notice of Allowance Issued in U.S. Appl. No. 11/321,490", dated May 21, 2014, 7 Pages.
"Final Office Action Issued in U.S. Appl. No. 11/321,777", Mailed Date: Jul. 9, 2009, 24 Pages.
"Non Final Office Action Issued in U.S. Appl. No. 11/321,777", dated Dec. 9, 2008, 23 Pages.
"Notice of Allowance Issued in U.S. Appl. No. 11/321,777", dated Dec. 11, 2009, 13 Pages.
"Final Office Action Issued in U.S. Appl. No. 11/321,789", dated Jul. 21, 2010, 12 Pages.
"Final Office Action Issued in U.S. Appl. No. 11/321,789", dated Dec. 12, 2011, 24 Pages.
"Non Final Office Action Issued in U.S. Appl. No. 11/321,789", dated Jun. 21, 2011, 13 Pages.
"Non Final Office Action Issued in U.S. Appl. No. 11/321,789", dated Feb. 26, 2010, 13 Pages.
"Final Office Action Issued in U.S. Appl. No. 11/321,820", dated Mar. 15, 2010, 17 Pages.
"Final Office Action Issued in U.S. Appl. No. 11/321,820", dated Nov. 23, 2010, 14 Pages.
"Non Final Office Action Issued in US Appl. No. 11/321,820", dated Jul. 20, 2010, 14 Pages.
"Non Final Office Action Issued in U.S. Appl. No. 11/321,820", dated Apr. 30, 2012, 15 Pages.
"Non Final Office Action Issued in U.S. Appl. No. 11/321,820", dated Oct. 14, 2009, 17 Pages.
"Final Office Action Issued in U.S. Appl. No. 12/345,288", dated Sep. 10, 2014, 40 Pages.
"Non Final Office Action Issued in U.S. Appl. No. 12/345,288", dated Aug. 5, 2015, 45 Pages.
"Non Final Office Action Issued in U.S. Appl. No. 12/345,288", dated Jun. 7, 2012, 36 Pages.
"Non Final Office Action Issued in U.S. Appl. No. 12/345,288", dated Jan. 3, 2014, 40 Pages.
"Notice of Allowance Issued in U.S. Appl. No. 12/345,288", dated Oct. 11, 2012, 19 Pages.
"Notice of Allowance Issued in U.S. Appl. No. 12/345,288", dated Feb. 3, 2016, 9 Pages.
"Final Office Action Issued in U.S. Appl. No. 12/487,212", dated May 2, 2012, 15 Pages.
"Non Final Office Action Issued in U.S. Appl. No. 12/487,212", dated Sep. 26, 2011, 17 Pages.
"Non Final Office Action Issued in U.S. Appl. No. 12/487,212", dated Oct. 15, 2014, 22 Pages.
"Non Final Office Action Issued in U.S. Appl. No. 12/487,212", dated Mar. 21, 2014,19 Pages.
"Final Office Action Issued in U.S. Appl. No. 13/296,014", dated Jun. 1, 2015, 17 Pages.
"Final Office Action Issued in U.S. Appl. No. 13/296,014", dated Oct. 25, 2013, 23 Pages.
"Non Final Office Action Issued in U.S. Appl. No. 13/296,014", dated Nov. 25, 2014, 16 Pages.
"Non Final Office Action Issued in U.S. Appl. No. 13/296,014", dated May 1, 2013, 17 pages.
"Notice of Allowance Issued in U.S. Appl. No. 13/296,014", dated Sep. 25, 2015, 5 Pages.
"First Office Action Issued in India Patent Application No. 2201/CHENP/2008", dated Feb. 6, 2015, 2 Pages.
Ader, et al., "WooRKS, an Object Oriented Workflow System for Offices", In Proceedings of the IEEE Bulletin of the Technical Committee on Data Engineering, vol. 18, No. 1, Mar. 1995, 81 Pages.
Akram, et al., "Application of Business Process Execution Language to Scientific Workflows", In Proceedings of International Transactions on Systems and Applications, 2006, 14 pages.
Office Action dated Oct. 4, 2016 cited in U.S. Appl. No. 14/497,799.
Paul, et al., "Presenting Windows Workflow Foundation", Sams Publishing, Beta Edition, Sep. 12, 2005, 4 Pages.
Notice of Allowance dated Mar. 15, 2017 cited in U.S. Appl. No. 14/497,799.
Angus, Jeff, "Jet Form's University Deployable Workflow", In Information Week, Issue 679, Apr. 27, 1998, 2 Pages.
Bhoedjang, Raoul A.F., "Communication Architectures for Parallel-Programming Systems", Retrieved from <<http://dare.ubvu.vu.nl/bitstream/1871/11711/1/5242.pdf>>, 2000, 281 Pages.
Bihler, et al., "Supporting Cross-Application Contexts with Dynamic User Interface Fusion", In Proceedings of the MoBe Workshop at Informatik, 2007, 6 Pages.
Bukovics, Bruce, "Chapters 1-19 of the Book Pro WF Windows Workflow in .NET 3.5", Published by Apress, Jun. 26, 2008, 739 Pages.
Casati, et al., "Specification and Implementation of Exceptions in Workflow Management System", In ACM Transactions on Database System, vol. 24, No. 3, Sep. 1999, pp. 405-451.
Chen, et al., "Multi-Agent Cooperation, Dynamic Workflow and XML forE-Commerce Automation", In Proceedings of the IEEE 4th International Conference on Autonomous Agents, Oct. 1999, 10 Pages.
Eberle, et al., "Implementation Architectures for Adaptive Workflow Management", In Proceedings of the Second International Conference on Adaptive and Self-Adaptive systems and Applications, 2010, pp. 98-103.
Ellis, et al., "Dynamic Change within Workflow Systems", In Proceedings of the ACM Conference on Organizational computing Systems, 1995, 12 Pages.
Garcia, et al., "FlowiXML: A Step Towards Designing Workflow Management Systems", In International Journal on Web Engineering and Technology, vol. 4, No. 2, 2008, pp. 163-182.
Hemel, et al., "WebWorkFlow: An Object-Oriented Workflow Modeling Language for Web Applications", Retrieved from: <<http://swerl.tudelft.nl/twiki/pub/Main/TechnicalReports/TUD-SERG-2008-029.pdf>>, Sep. 28, 2008, 19 Pages.
Hollingsworth, David, "The Workflow Management Coalition- The Workflow Reference Model", Retrieved from: <<ftp://www.ufv.br/

(56) References Cited

OTHER PUBLICATIONS dpi/mestradoWkflow-BPM/the%20Workflow%20Reference%20Model.pdf>>, Jan. 19, 1995, 55 Pages.

Huang, et al., "Unified Enterprise Modeling and Integration Environment Based on Workflow Technology", In Proceedings of the IEEE 3rd International Conference on Electronic Commerce, Oct. 2003, pp. 1000-1003.

Kamath, Mohan Umesh, "Improving Correctness and Failure Handling in Workflow Management Systems", A Ph. D. Dissertation Presented on Improving Correctness and Failure Handling in Workflow Management Systems, University of Massachusetts Amherst, 1998, 227 Pages.

Kappel, et al., "A Framework for Workflow Management Systems Based on Objects, Rules and Roles", In Journal of ACM Computing Surveys, vol. 32 Issue 1es, Article No. 27, Mar. 2000, 5 Pages.

Kim, et al., "WW-FLOW: Web Based Workflow Management with Runtime Encapsulation", In IEEE Internet Computing, vol. 4, No. 3, May-Jun. 2000, pp. 55-64.

Leymann, et al., "Workflow-Based Applications", In IBM Systems Journal, vol. 36, No. 1, 1997, pp. 102-123.

Li, et al."A Language-Based Approach to Unifying Events and Threads", Retrieved from <<http://www.cis.upenn.edu/~stevez/papers/LZ06b.pdf>>, Apr. 29, 2006, 15 Pages.

Lond, et al., "Accommodating Change in Enterprise Applications", Retrieved from: <<http://citeseerx.ist.psu.edu/viewdock/download?doi=10.1.1.599.2630&rep=rep1&type=pdf>>, 2002, 110 Pages.

Manolescu, Dragos A., "An Extensible Workflow Architecture with Objects and Patterns", In Chapter 4 of Technology of Object-Oriented Languages, Systems, and Architectures, 2003, 12 Pages.

Manolescu, et al., "Dynamic Object Model and Adaptive Workflow", In Proceedings of Metadata and Active Object-Model Pattern Mining Workshop Co-located with OOPSLA, vol. 99, 1999, 19 Pages.

Manolescu, Dragos A., "Workflow Enactment with Continuation and Future Objects", In Proceedings of the ACM Conference on Object-Oriented Programming, Systems, Languages, and Applications, 2002, pp. 40-51.

Matthias, et al., "WS-BPEL Extension for People—BPEL4People", In a joint White Paper by IBM and SAP, Jul. 2005, 18 Pages.

Mayers, Chris, "ANSAwise-Persistent Data Storage with CORBA", Citrix Systems, Cambridge, UK, Apr. 4, 1996, 31 Pages.

Miller, et al., "WebWork: METEOR2's Web-based Workflow Management System", In Journal of Intelligent Information Systems, Special Issue Workflow Management Systems, vol. 10, No. 2, Mar.-Apr. 1998, 35 Pages.

Moldt, et al., "Pattern Based Workflow Design Using Reference Nets", In Lecture Notes in Computer Science, Business Process Management: International Conference, Jun. 26-27, 2003, 2 Pages.

Muth, et al., "From Centralized Workflow Specification to Distributed Workflow Execution", In Journal of Intelligent Information Systems, vol. 10, No. 2, Mar. 1998, 2 Pages.

Nakatani, Yoshihisa, "Java Development Environment of GUI base to Achieves from Application Development to System Integration on BEA WebLogic Platform 8.1J, Try Using BEA WebLogic Platform D 8.1J", In DB Magazine, vol. 13, No. 8, Nov. 1, 2003, 10 Pages.

Ott, Marcus, "Conceptual Design and Implementation of a Graphical Workflow-Modeling Editor in the Context of Distributed Groupware-Databases", In Masters Thesis submitted at Department for Information Management, May 1994, 168 Pages.

Xavier, et al., "A Cooperative Workflow Management System with the Meta-Object Facility", In Proceedings of the IEEE 5th International Enterprise Distributed Object Computing Conference, 2001, 8 Pages.

Paul, et al., "RainMan: A Workflow System for the Internet", In Usenix Symposium on Internet Technologies and Systems, 1997, 12 Pages.

"International Search Report and Written Opinion Issued in PCT Application No. PCT/US2006/047220", dated Jun. 8, 2007, 8 pages.

Pickett, et al., "libspmt: A Library for Speculative Multithreading", In Proceedings of Sable Technical Report No. 1-2007, Mar. 12, 2007, 22 Pages.

Rodriguez, Jesus, "Windows Workflow Foundation Runtime Services: The Persistence Service", Retrieved from <<http://web.archive.org/web/20051212062613/http://weblogs.asp.net/gsusx/archive/2005/10/05/426699.aspx>>, Retrieved Date: Nov. 23, 2009, 6 Pages.

Russell, et al., "Workflow Data Patterns", In QUT Technical Report, FIT-TR-2004-01, Queensland University of Technology, Apr. 2004, 75 Pages.

Sasaki, Masakazu, "Java Development Environment of GUI Base to Achieves from Application Development to System Integration on BEA WebLogic Platform 8.1J, Try using BEA WebLogic Platform 8.1J", In DB Magazine, vol. 13, No. 8, Nov. 1, 2003, 12 Pages.

Savinov, Alexandr, "Concept as a Generalization of Class and Principles of the Concept-Oriented Programming", In Computer Science Journal of Moldova, vol. 13, No. 3(39), 2005, 44 Pages.

Sotnikova, Anastasia, "An Evaluation of Methodological Issues in Workflow Management", A Thesis Submitted to the Department of Computer Engineering and Information Science and the Institute of Engineering and Science of Bilkent University, Aug. 1998, 81 Pages.

Vossen, et al., "The WASA2 Object-Oriented Workflow Management System", In Proceedings of the ACM SIGMOD International Conference on Management of Data, Jun. 1999, pp. 587-589.

Weske, et al., "Flexible Persistence Framework for Object-Oriented Middleware", Retrieved from: <<http://citeseerx.ist.psu.edu/viewdoc/download?doi=10.1.1.10.844&rep=rep1&type=pdf>>, Jun. 25, 2001, 26 Pages.

Wirtz, et al., "The OCoN Approach to Workflow Modeling in Object-Oriented Systems", In Journal on Information Systems Frontiers, vol. 3, Issue 3, Sep. 2001, pp. 357-376.

* cited by examiner

FIG. 1

System.Activities 202
WorkflowElement
Activity
DynamicActivity
CodeActivity
NativeActivity
WorkflowElement<T>
Activity<T>
DynamicActivity<T>
CodeActivity<T>
NativeActivity<T>
ActivityContext
CodeActivityContext
ActivityExecutionContext
Variable
Variable<T>
Argument
InArgument<T>
OutArgument<T>
InOutArgument<T>
ActivityDelegate
ActivityAction,
ActivityAction<T>,
ActivityAction<T1, T2>, ...
ActivityFunc,
ActivityFunc<TResult>,
ActivityFunc<TResult, T1>, ...

System.Activities.Hosting 204
ActivityRuntime
ActivityRuntimeContext
WorkflowInstance
WorkflowInvoker
ActivityServices

System.Activities.Core 206
Sequence
If
ForEach
ParallelForEach
Parallel
Flowchart
StateMachine
InvokeMethod

System.Activities.Validation 208
ActivityValidationServices
Constraint
Constraint<T>
ConstraintViolation

System.Activities.Tracking 210
TrackingRecord
ActivityTrackingRecord
TrackingParticipant
TrackingProfile

System.ServiceModel.Activities 212
SendMessage
ReceiveMessage
Send<T>
Receive<T>
CorrelationHandle
CorrelationScope

*FIG. 2*

INTERFACE INFRASTRUCTURE FOR A CONTINUATION BASED RUNTIME

CROSS-REFERENCE TO RELATED APPLICATIONS

This application is a Continuation of U.S. patent application Ser. No. 12/345,288 filed on Dec. 29, 2008, entitled "Interface Infrastructure for a Continuation Based Runtime," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Computer programming can take a number of different forms. For example, computer programmers can develop programs using imperative code. Imperative code is code that directly indicates actions that computer hardware should perform. For example, machine language code may use commands that directly control what is entered into, deleted from, moved to and from, registers and memory locations. Higher level imperative code can be compiled into machine language or binary code to cause the computer hardware to perform desired actions.

Declarative code, in contrast, uses declarative statements to declare the structure of a workflow, where the workflows make general statements about what results should occur from hardware operations rather than defining the specific hardware operations themselves. For example an XML-based language called XAML is commonly used for declaring the structure of a workflow. Workflows can be used in defining continuation based, declarative applications. However, it can be difficult to build continuation-based, declarative applications of various scale and complexity.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Some embodiments described herein are directed to using a namespace organization to implement a framework for creating and executing continuation-based runtimes. In particular, some embodiments include a computer readable storage media having stored thereon computer executable instructions for implementing a framework for enabling the creation and/or execution of continuation-based declarative applications. The computer readable medium includes a fist set of APIs. Each of the APIs is for writing continuation based runtimes. Each of the APIs in the first set of APIs are included in a first common namespace for an activity model of a continuation-based runtime. Each of the APIs in the first set of continuation based runtime APIs are represented with a first common namespace prefix for logical grouping of the plurality of continuation-based runtime APIs.

Other embodiments may organize APIs into other namespaces. For example, a second set of APIs may be organized in a second common namespace where the second set of APIs are used to host, execute, and manage instances of continuation-based, declarative programs. A third set of APIs may be organized in a third common namespace where the third set of APIs are used to implement a base layer of activities that add functionality to the continuation-based runtime and that are used to add concrete behaviors that build on top of a core activity model. A fourth set of APIs may be organized in a fourth common namespace where the fourth set of APIs are used for providing and executing build constraints and policy constraints. Build constraints validate that a given workflow does not violate any runtime or activity assumptions which would most likely cause runtime exceptions. Policy constraints warn of potential issues including one or more of best practice violations, design guideline violations, or company policy violations. A fifth set of APIs may be organized in a fifth common namespace where the fifth set of APIs are used for defining and consuming tracking events. A sixth set of APIs may be organized in a sixth common namespace where the sixth plurality of APIs are used for modeling communication with other systems by sending and receiving messages in and out of a workflow. This set may also include APIs with functionality for representing a continuation-based program as a service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein are directed to a framework using continuation based runtime namespaces that pertain to an infrastructure for enabling the creation of a wide variety of continuation-based programs that perform a wide-array of tasks. The infrastructure provides a foundation for building continuation-based, declarative applications of various scale and complexity. In some embodiments, the associated application programming interfaces (APIs) are factored into a hierarchy of namespaces in a manner that balances utility, usability, extensibility, and versionability.

Figure 1:
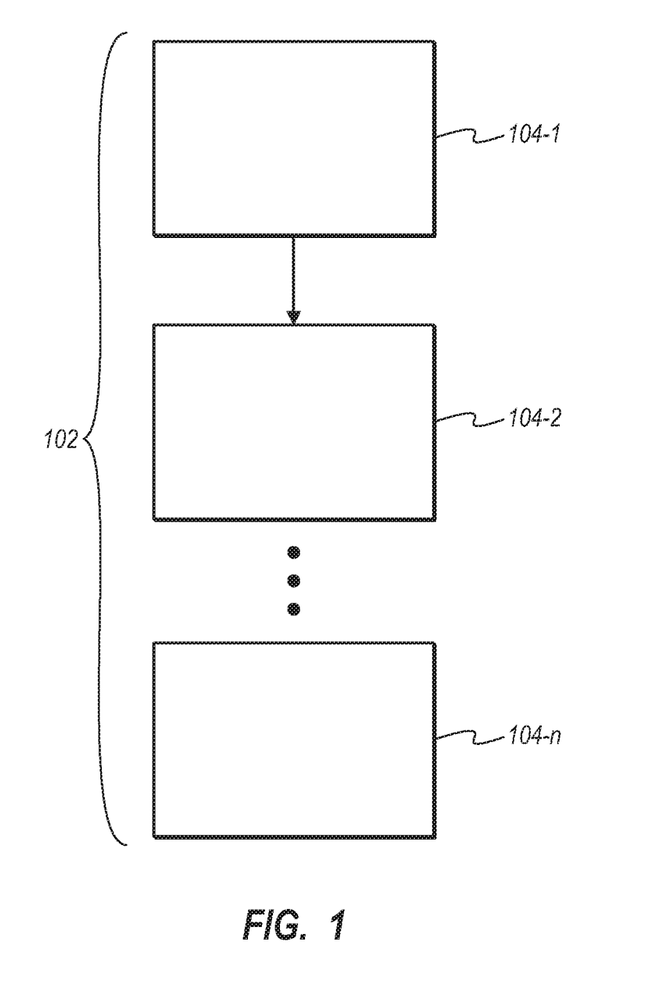
FIG. 1 illustrates an example workflow and scheduled activities.

A continuation based runtime executes activities. An activity represents a unit of executable code including multiple pulses of work. One of the ways an activity can execute multiple pulses of work is through the scheduling of child activities. This composition of activities enables custom control flows that can be implemented through the scheduling of child activities 0, 1 or n times as determined by the composite activity. An example is illustrated FIG. 1, which illustrates a workflow 102, with a number of scheduled activities illustrated generally as 104 and specifically as 104-2, 104-2, through 104-*n*, where n is the number of activities in a workflow.

An activity can also setup a resumable continuation in its execution that is resumed by a stimulus external to the runtime. The runtime interprets this external stimulus as another pulse of work to be handled by the activity. Pulses of work are represented internally as continuations that the runtime invokes on activities (thus: continuation based runtime). Activities may also have the following characteristics: They have no process affinity, i.e., they can be paused and resumed in a different process. They have no thread affinity, meaning that different pulses of work can be run on different threads. They can be persisted and rehydrated.

Workflows, like traditional imperative programs, allow one to coordinate work but have some important differences. Workflows can handle long running work by persisting to a durable store, such as a database, when idle and loading again once there is work to do. An instance of a workflow can be modified dynamically while running in the event that new conditions require the workflow to behave differently than it did when it was created. Workflows are a declarative way of writing programs by linking together pre-defined activities rather than an imperative programming model of writing lines of code. Workflows allow one to declare business rules that are separated from code making it easier for one to modify them in the future. Workflows support different styles of systems with sequential and state machine workflows.

An XML-based language called XAML is often used for declaring the structure of a workflow. However, the workflow may also be expressed in other code, such as using any .NET-targeted language (VB.NET, C#, C++/CLI, etc.).

Declarative coding provides developers with the ability to separate the logic of an application from the underlying imperative execution components.

Some embodiments are directed to a continuation based runtime namespace infrastructure for enabling the creation of a wide variety of continuation-based programs that leverage the aforementioned runtime. The infrastructure provides a foundation for building continuation-based, declarative applications of various scale and complexity. The infrastructure or framework provides APIs for continuation-based execution, composite execution, passivatable systems, reactive execution, coordinated sets of inputs, and customized vocabularies Enhancing features of a continuation-based runtime namespace include a set of activities to perform continuation-based work. Activities come in differing levels of functionality and usability, and include but are not limited to rules-based activities, state machine-based activities, sequential-based activities, database activities, powershell-based activities, web Services-based activities, and Flowchart-based activities.

Figure 2:
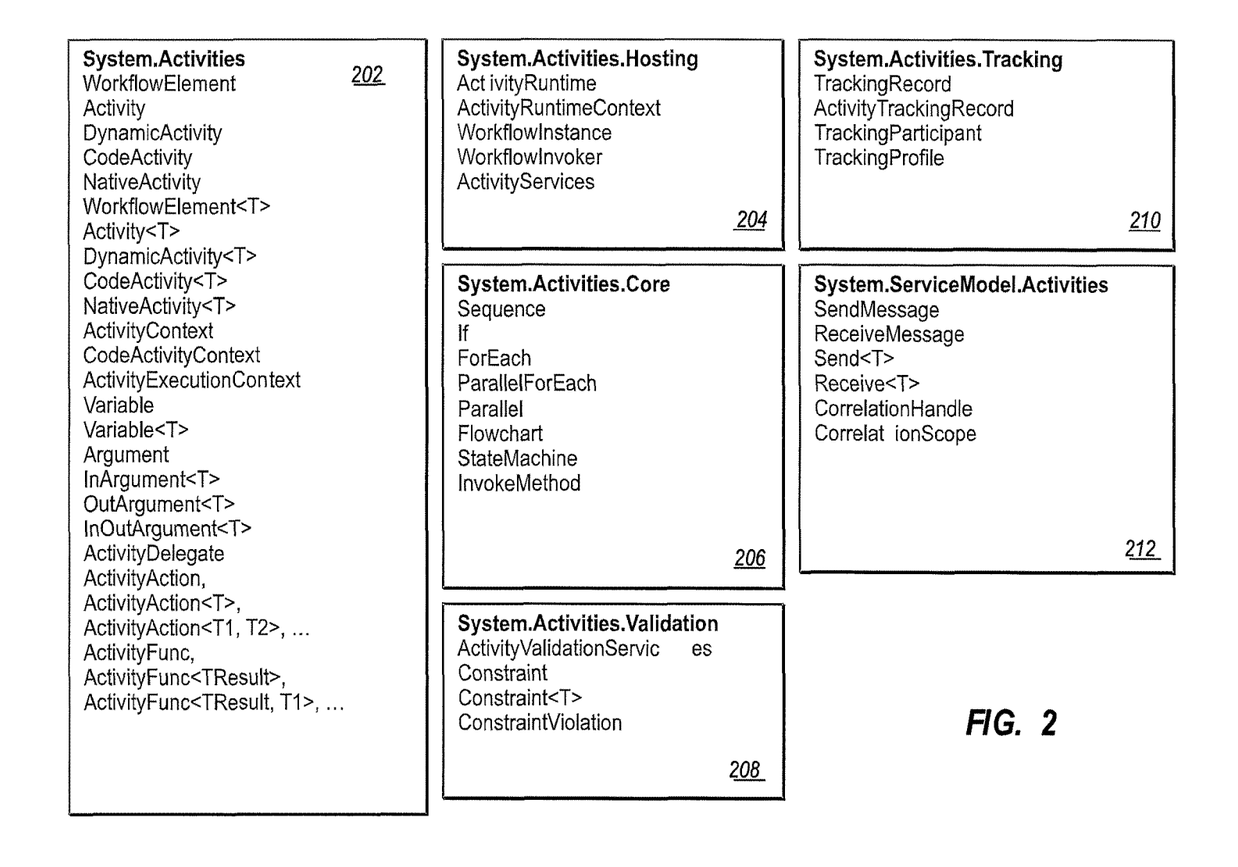
FIG. 2 illustrates a logical namespace based organization of continuation-based APIs.

In some embodiments, the associated APIs are stored on computer readable media (such as those described later herein) and factored logically into a hierarchy of namespaces in a manner that balances utility, usability, extensibility, and versionability. In the following examples, namespaces and classes have been named with specific selected names. However, it should be understood that different namespace names may be selected which implement the same or similar functionality. Notably, APIs may be represented with a common namespace prefix for logical grouping of the APIs depending on what namespace the APIs are organized into. FIG. 2 illustrates the logical organization of APIs within namespaces in a framework. The APIs may be represented, for example, as source code and/or as compiled code. The APIs may be operatable on the .NET platform. The .NET platform, available from Microsoft corporation of Redmond Wash., includes a library of code and a virtual machine that manages the execution of programs written using the code.

Some embodiments include a root namespace for an activity model of the continuation based runtime. In this example, this root namespace is named System.Activities 202. As noted, this is the root namespace for the activity model of the continuation-based runtime. Specifically, it represents the APIs that are utilized to write a scalable, continuation-based, declarative program. This set of APIs is grouped together in part because it represents a logical, core layer of the activities model and it is possible to write an application using only those APIs in the root namespace and no other continuation-based runtime namespaces. The following illustrates a number of classes with names selected for readability, but which may be modified in specific embodiments) any or all of which may be organized into the root namespace for an activity model of a continuation based runtime.

One core class of this namespace is illustrated, in this example, as WorkflowElement. The WorkflowElement class represents continuation-based behavior. In particular, instances of the WorkflowElement class include the imperative code in their bodies that is executed by a processor to perform certain functions. This class is used for declaring properties and parameters that are polymorphic across authoring styles.

Hierarchically below the WorkflowElement class, is an Activity class. An Activity is an abstract WorkflowElement (with protected constructor) that is used for declaratively composing behavior into new "types". The execution logic of an Activity is represented by other WorkflowElements. An Activity object may have declared, for example using declarative programming, within its body one or more WorkflowElements.

Hierarchically below the WorkflowElement class, is a DynamicActivity class. In the illustrated example, a DynamicActivity is a concrete sealed WorkflowElement (with a public constructor) that is used for declaratively composing behavior "dynamically" using an Activity document object model (DOM). This activity is used by hosters to load activities without requiring new types.

Hierarchically below the WorkflowElement class, is a CodeActivity class. A CodeActivity is an abstract WorkflowElement (with a protected constructor) that is used for writing imperative behavior through an Execute method that has access to data resolution and extensions. CodeActivity is used for writing simple imperative behavior that is semantically equivalent to using Activity with a single-line "InvokeMethod" body (see below). CodeActivity only has an Execute( ) method, and in the present example, it does not have Cancel or Abort functionality.

Hierarchically below the WorkflowElement class, is a NativeActivity class. NativeActivity is an abstract WorkflowElement (with a protected constructor) that is used for writing imperative behavior through an Execute method that has unfettered access to the full breath of the runtime. This includes support for scheduling children, intercepting Cancel( ) and Abort( ) signals, creating continuations, and interacting with execution properties.

Hierarchically below the WorkflowElement class, is a WorkflowElement<T> class. WorkflowElement<T> represents continuation-based "functional" behavior that has a well-known, elevated return value. It is used for declaring properties and parameters with a return value that are polymorphic across authoring styles.

Hierarchically below the WorkflowElement<T> class is an Activity<T> class. Activity<T> is an abstract WorkflowElement<T> (with protected constructor) that is used for declaratively composing behavior into new "types". The execution logic of an Activity<T> is represented by other WorkflowElements.

Hierarchically below the WorkflowElement<T> class is a DynamicActivity<T> class. DynamicActivity<T> is a concrete sealed WorkflowElement<T> (with a public constructor) that is used for declaratively composing behavior "dynamically" using an Activity DOM. The objects can be used by hosters to load activities without requiring new types.

Hierarchically below the WorkflowElement<T> class is a CodeActivity<T> class. CodeActivity<T> is an abstract WorkflowElement<T> (with a protected constructor) that is used for writing imperative behavior through an Execute method that has access to data resolution and extensions. CodeActivity<T> is used for writing simple imperative behavior that is semantically equivalent to using Activity<T> with a single-line "InvokeMethod" body. In this example CodeActivity<T> only has an Execute( ) method, it does not have Cancel or Abort functionality.

Hierarchically below the WorkflowElement<T> class is a NativeActivity<T> class. NativeActivity<T> is an abstract WorkflowElement<T> (with a protected constructor) that is used for writing imperative behavior through an Execute method that has unfettered access to the full breath of the runtime. This includes support for scheduling children, intercepting Cancel( ) and Abort( ) signals, creating continuations, and interacting with execution properties.

Another base class in the System.Activities 202 namespace is the ActivityContext base class. CodeActivity/CodeActivity<T> and NativeActivity/NativeActivity<T> have contexts passed to them for interfacing with the continuation-based runtime. ActivityContext is the abstract base class for all such contexts. It allows for environment access (i.e. argument/variable resolution) and access to host extensions.

Hierarchically below the ActivityContext class is the CodeActivityContext class. CodeActivityContext is the ActivityContext passed into CodeActivity/CodeActivity<T>.Execute( ). It adds async operation support to ActivityContext.

Hierarchically below the ActivityContext class is the ActivityExecutionContext class. ActivityExecutionContext is the context passed into NativeActivity/NativeActivity<T> methods (Execute, Cancel, and Abort). This class adds support for child management (scheduling, cancelling), setting up no-persist zones, isolation blocks, and bookmarks.

The root namespace System.Activities 202 includes a Variable class. Variable represents the storage of data in a continuation-based program. It has a Type and an (optional) Name.

The root namespace System.Activities 202 includes a Variable<T> class. Variable<T> is a concrete Variable class that strongly represents the type of the Variable through a generic parameter.

The root namespace System.Activities 202 includes an Argument class. Argument is a binding terminal that presents the flow of data for an activity. Arguments declared on an activity definition define the activity's signature. Arguments are bound using expressions that may reference variables as part of activity usage. Arguments have a Type and a Direction (In, Out, or InOut).

The root namespace System.Activities 202 includes an InArgument<T> class. InArgument<T> is a concrete Argument class with a Direction==In, that strongly represents the type of the Argument through a generic parameter.

The root namespace System.Activities 202 includes an OutArgument<T> class. OutArgument<T> is a concrete Argument class with a Direction==Out, that strongly represents the type of the Argument through a generic parameter.

The root namespace System.Activities 202 includes an InOutArgument<T> class. InOutArgument<T> is a concrete Argument class with a Direction==InOut, that strongly represents the type of the Argument through a generic parameter.

The root namespace System.Activities 202 includes an ActivityDelegate class. ActivityDelegate is an abstract base class which represents a snippet of workflow with a specific signature. The signature is a set of parameters and the handler is a WorkflowElement. ActivityDelegate allows an activity author to model parameterized callbacks within the continuation based system.

One or more action classes may be implemented hierarchically below the ActivityDelegate class. Some examples of these include ActivityAction, ActivityAction<T>, ActivityAction<T1, T2>, etc. classes. ActivityAction and related generic types are concrete ActivityDelegates with packaged signatures of zero or more In-parameters.

One or more action classes may be implemented hierarchically below the ActivityDelegate class. These include ActivityFunc, ActivityFunc<TResult>, ActivityFunc<TResult, T1>, etc. ActivityFunc and related generic types are concrete ActivityDelegates with packaged signatures of a single out-parameter and zero or more in-parameters.

Another namespace in the framework is a namespace representing a collection of APIs that are used to host, execute, and manage instances of continuation-based, declarative programs. In this example, the System.Activities.Hosting 204 namespace is the namespace that holds the APIs that are utilized to host, execute and manage instances of continuation-based, declarative programs. This namespace may also include classes implementing the ability to serialize in-flight instances of continuation-based programs. This set of APIs is grouped together because it represents a distinct layer of functionality used to address the problems involved in hosting and executing workflows. Some illustrative classes of this namespace any or all of which may be included in this namespace, illustrated in this example, include the following classes.

The System.Activities.Hosting 204 namespace may include an ActivityRuntime class. ActivityRuntime is a lightweight, per-instance runtime. It can be constructed to create a new workflow instance or to load an existing instance. The APIs that ActivityRuntime exposes are the minimal set of runtime controls from which higher level operations can be implemented. Additionally, this API set represents the entire breadth of functionality of the runtime.

The System.Activities.Hosting 204 namespace may include an ActivityRuntimeContext class. Instances of this class instantiate implementations of the abstract ActivityRuntimeContext and provide the ActivityRuntime access to such host functionality as synchronization, persistence, tracking, and extensions. Additionally, this interface allows the runtime to notify the host of important events such as the transition from running to paused and the occurrence of unhandled exceptions.

The System.Activities.Hosting 204 namespace may include a WorkflowInstance class. WorkflowInstance is a locus of control for workflow instance management. It acts as the thread safe proxy to runtime operations on an instance.

The System.Activities.Hosting 204 namespace may include a WorkflowInvoker class. WorkflowInvoker is a model for directly running an activity as if it were a method call. This is a lightweight, performant, easy to use API for use in scenarios where an activity's execution does not require the control infrastructure provided by WorkflowInstance or ActivityRuntime.

The System.Activities.Hosting 204 namespace may include an ActivityServices class. ActivityServices is the primary entry point for accessing the myriad of hosting services such as Validation, Xaml, Reflection, etc).

The framework may further include a namespace for the base layer of activities that add functionality to the continuation-based runtime. Specifically, this namespace organizes the APIs that are utilized to add concrete behaviors that build on top of the core activity model. In this example, this namespace is represented by System.Activities.Core 206. As noted, this is a namespace for the base layer of activities that add functionality to the continuation-based runtime. Classes of this namespace may include one or more classes such as are illustrated below.

The System.Activities.Core 206 namespace may include a Sequence class. Sequence is a control-flow activity that is configured with a set of WorkflowElements that it schedules for execution in sequential order (when one completes it will schedule the next one). Sequence is also configured with a set of variables that are used to store state across child activity execution boundaries.

The System.Activities.Core 206 namespace may include an If class. If is a control-flow Activity that is configured with a WorkflowElement-based condition and two WorkflowElements that represent "Then" and "Else" actions of If Then Else logic. Depending on the outcome of the condition, If schedules for execution either the "Then" WorkflowElement or the "Else" WorkflowElement.

The System.Activities.Core 206 namespace may include a ForEach class. ForEach is a control-flow Activity that is configured with a WorkflowElement-based ActivityAction, and an Enumeration to iterate through. ForEach will incrementally go through the enumeration and invoke the configured "Body" ActivityAction with the current value of the enumeration. When that Action completes, it will get the next value from the enumeration and execute the Action with the new value, etc.

The System.Activities.Core 206 namespace may include a ParallelForEach class. ParallelForEach is similar to ForEach, except that the branch for each value in the enumeration is executed in parallel. It also has an early— completion condition that can be set to break out of the enumeration after a particular condition has been satisfied.

The System.Activities.Core 206 namespace may include a Parallel class. Parallel is a control-flow Activity that is configured with a set of WorkflowElements that it schedules for execution all at once. Parallel is also configured with a set of Variables that are used to store state across child Activity execution boundaries as well as an early-completion condition that cat be set to cancel outstanding branches of execution after a particular condition has been satisfied.

The System.Activities.Core 206 namespace may include a Flowchart class. Flowchart is a control-flow Activity that is configured with a set of Nodes that store WorkflowElements for behavior and additional metadata about the next Node that should be scheduled. Flowchart interprets this metadata about nodes into orchestration logic that can follow paths of execution based on steps, decisions, multi-branch switch statements, and more. Flowchart is also configured with a set of Variables that are used to store state across child Activity execution boundaries.

The System.Activities.Core 206 namespace may include a StateMachine class. StateMachine is a control-flow Activity that is configured with a set of States and Transitions. StateMachine interprets this metadata about nodes into orchestration logic that follows the formal models of state machines in executing a reactive system. Events are modeled as WorkflowElements and Conditions control which transition will be followed to enter the next State of processing. StateMachine is also configured with a set of Variables that are used to store state across child Activity execution boundaries.

The System.Activities.Core 206 namespace may include an InvokeMethod class. InvokeMethod is a workflow element which facilitates method calls. InvokeMethod is used for interfacing with common language runtime (CLR) methods and allows users the ability to call methods against objects, pass in parameters, get the return value, specify types for generic methods, and specify if the method is synchronous or asynchronous.

Another namespace that may be included in the framework is a namespace that holds APIs used for providing and executing build constraints and policy constraints. Build constraints validate that a given workflow does not violate any runtime or activity assumptions which would most likely cause runtime exceptions. Policy constraints, on the other hand, warn of potential issues including best practice violations, design guideline violations, company policy violations, and miscellaneous common mistakes. Using these two mechanisms, the APIs in this namespace are used to provide assurances that a validated workflow will execute as the developer intended. In this example, this namespace is referred to as the System.Activities.Validation 208 namespace. The following illustrates a number of classes, any or all of which, may be included in this namespace.

The System.Activities.Validation 208 namespace may include an ActivityValidationServices class. ActivityValidationServices is the mechanism by which workflows can be validated against a set of constraints. As a result of this validation process, a set of violations may be produced.

The System.Activities.Validation 208 namespace may include a Constraint class. The Constraint base class provides the interface between ActivityValidationServices component and the validation constraint that the user wants to implement.

The System.Activities.Validation 208 namespace may include a Constraint<T> class. Constraint<T> provides strongly typed, ActivityAction based sugar on the base class to enable a simple experience for the constraint author. The ToValidate object from the base Constraint is cast to T and provided as the Body's argument allowing the Body to deal in terms of a strongly typed Variable<T>. This makes authoring easy in both XAML and imperative code.

The System.Activities.Validation 208 namespace may include a ConstraintViolation class. A ConstraintViolation contains the message and error level information of a constraint failure. Not that a single constraint can generate zero or more ConstraintViolations in a single execution.

The framework may include a namespace that holds APIs used for defining and consuming tracking events. The Workflow runtime produces a stream of events that follow its execution. Distinct from the definition of the Workflow, a user may add consumers of these events. In this example, this namespace is referred to as System.Activities.Tracking 210. This namespace may include a number of classes such as one or more of the following.

The System.Activities.Tracking 210 namespace may include a TrackingRecord class. This is the base class that represents a record containing information about the runtime execution process of a continuation-based program. It defines a common set of fields such as TraceLevel and record number.

The System.Activities.Tracking 210 namespace may include an ActivityTrackingRecord class. This is the base class that represents a record associated with an Activity. It contains the state of the Activity when that record was emitted, the Id of the activity, and values extracted from the running instance at the time the tracking record was emitted.

The System.Activities.Tracking 210 namespace may include a TrackingParticipant class. This is the base class for a consumer of tracking records. A TrackingParticipant can enlist in the Workflow transaction through the PersistenceParticipant mechanism.

The System.Activities.Tracking 210 namespace may include TrackingProfile class. A TrackingProfile is a declarative definition of filters against event type and the data that should to be queried from the workflow instance (e.g. value of a variable) for a given event. TrackingProfiles can apply to multiple different Workflows and can be associated with multiple TrackingParticipants. TrackingProfiles, their management and their storage are reusable by the authors of TrackingParticipants.

The framework may include a namespace that holds the APIs used for modeling communication with other systems by sending and receiving messages in and out of a workflow. It also includes the APIs with functionality for representing a continuation-based program as a service. In this example, this namespace is referred to as the System.ServiceModel.Activities 212 namespace. Example classes, any or all of which may be included in this namespace, are enumerated below.

The System.ServiceModel.Activities 212 namespace may include a SendMessage class. SendMessage allows users to send data out of a workflow in the form of a message.

The System.ServiceModel.Activities 212 namespace may include a ReceiveMessage class. ReceiveMessage allows users to wait for external stimuli in a continuation-friendly manner by exposing a web service endpoint to receive Messages.

The System.ServiceModel.Activities 212 namespace may include a Send<T> class. Send<T> provides a friendly programming model for sending data that is either a DataContract-based payload, XmlSerializable-based payload, XElement, Stream, or Message.

The System.ServiceModel.Activities 212 namespace may include a Receive<T> class. Receive<T> provides a friendly programming model for receiving data that is either a DataContract-based payload, XmlSerializable-based payload, XElement, Stream, or Message.

The System.ServiceModel.Activities 212 namespace may include a CorrelationHandle class. In workflows, application protocols are decomposed into one-way message exchanges that use a handle based model for relating messaging activities regardless of the underlying correlation mechanism. CorrelationHandle is the name given to the type of handles that facilitate correlation.

The System.ServiceModel.Activities 212 namespace may include a CorrelationScope class. CorrelationScope is used to provide an implicit CorrelationHandle that can be used by Send and Receive activities to loosen the requirements for the user on providing correlation bindings at each individual activity.

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of executing continuation-based declarative applications, the method comprising:
 calling a first interface that represents continuation-based functional behavior, wherein instances of the first interface include imperative code in their bodies that is executed by a processor to perform functions, and wherein the first interface is polymorphic;

calling a second interface used to store data in the continuation-based runtime, the interface including a type and a name;

calling a plurality of argument interfaces, wherein each of the argument interfaces is a binding terminal that represents the flow of data for instances of the first interface, the plurality of argument interfaces comprising:

an inargument interface that has a direction of In;

an outargument interface that has a direction of Out; and an inoutargument interface that has a direction of InOut; and calling a second plurality of interfaces, wherein the second plurality of interfaces are used to host instances of continuation-based, declarative programs.

2. The method of claim 1 further comprising, calling a plurality of the interfaces including:

an interface used for declaratively composing behavior dynamically using an Activity document object model;

an interface used for writing imperative behavior through an Execute method that has access to data resolution and extensions;

an interface used for writing imperative behavior through an Execute method that has unfettered access to the full breath of the runtime;

an interface used for implementing a continuation-based functional behavior that has a well-known, elevated return value;

an interface used for allowing for environment access;

an interface that adds async operation support to the interface used for allowing environment access;

an interface that adds support for child management, setting up no-persist zones, isolation blocks, and bookmarks;

an interface used for the storage of data in a continuation-based program;

an interface used for implementing a binding terminal that represents the flow of data for an activity; and an interface used for implementing a snippet of workflow with a specific signature.

3. The computer readable medium of claim 1, wherein the second plurality of interfaces comprises:

an interface used to create a new workflow instance or to load an existing instance;

an interface used to provide the interface used to create a new workflow instance or to load an existing instance to host functionality including synchronization, persistence, tracking, and extensions;

an interface used for implementing a locus of control for workflow instance management;

an interface used for directly running an activity as if it were a method call; and an interface used for implementing a primary entry point for accessing a plurality of hosting services.

4. The method of claim 1, further comprising calling a third plurality of interfaces, wherein the third plurality of interfaces are used to implement a base layer of activities that add functionality to the continuation-based runtime and that are used to add concrete behaviors that build on top of a core activity model.

* * * * *